Patented Jan. 21, 1930

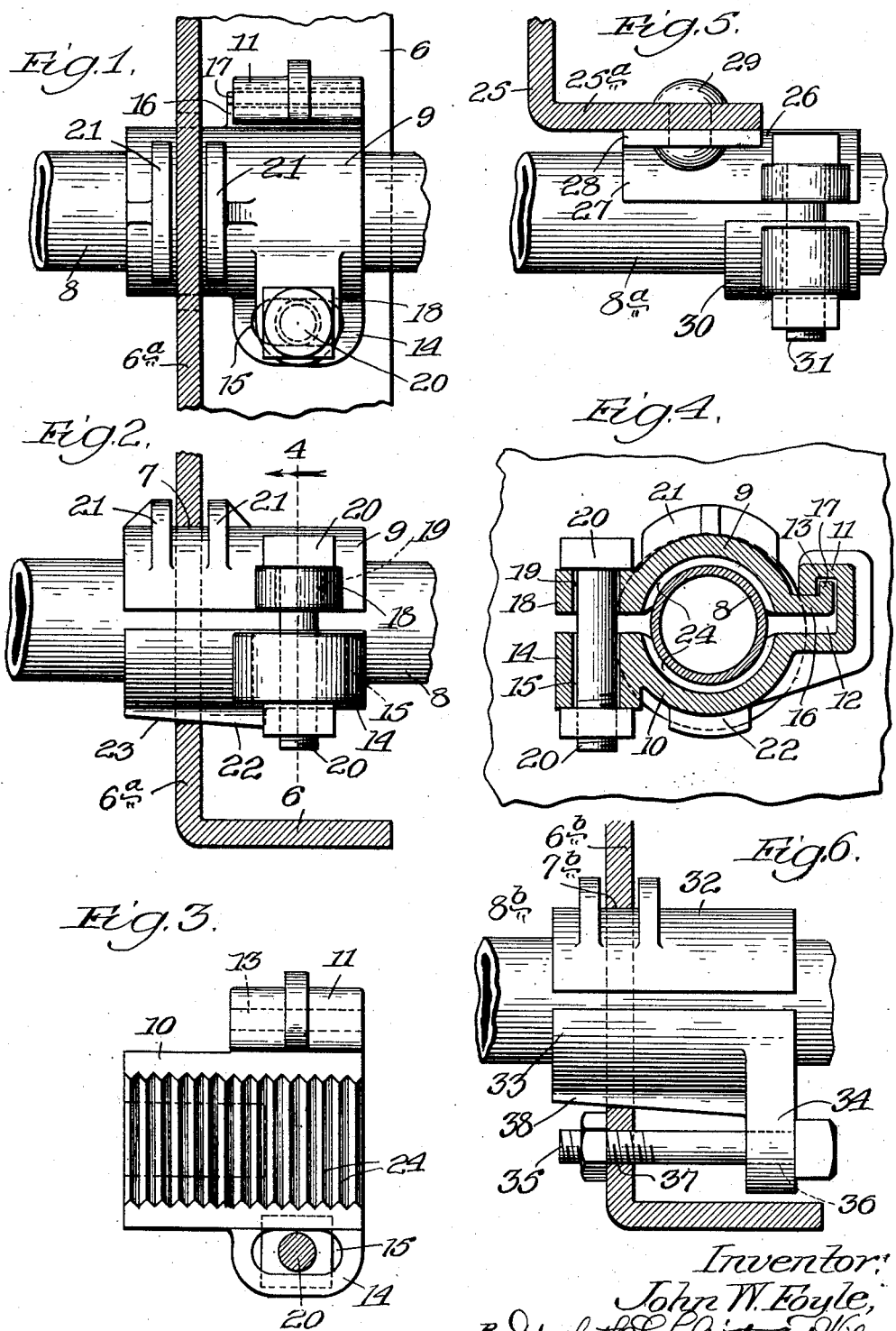

1,744,537

UNITED STATES PATENT OFFICE

JOHN W. FOYLE, OF KANSAS CITY, MISSOURI, ASSIGNOR TO GUSTIN-BACON MANUFACTURING CO., OF KANSAS CITY, MISSOURI, A CORPORATION OF MISSOURI

PIPE-SECURING MEANS

Application filed March 19, 1927. Serial No. 176,649.

My invention relates, more particularly, though not exclusively, to means for rigidly supporting the air pipes of compressed air brake systems on the underframes of cars to maintain them against longitudinal movement thereon, these air pipes being provided at the undersides of the frames of the cars and usually passing through openings in cross members of the frames, though in some instances extending entirely below the elements of the frames.

My primary object is to provide a novel, simple and economical construction of securing means which may be readily applied to operative position and when so applied will be highly effective in preventing longitudinal movement of the pipe.

Certain of my more specific objects are to provide a construction of securing means which shall be composed of the minimum number of fastening devices, such as bolts or the like; and to provide securing means which may be readily adjustable into rigid engagement with the wall of an opening through which the pipe extends and avoid wear of the pipe.

Referring to the accompanying drawings:—

Figure 1 is a broken plan sectional view of the air-pipe-equipped underframe of a car equipped with my improved securing means. Figure 2 is a view in vertical sectional elevation of the construction shown in Fig. 1. Figure 3 is a plan view of the lower one of the two clamp sections, viewing the device as positioned in Fig. 2, this view showing the connecting bolt in section in one of the positions it occupies in securing the sections together. Figure 4 is a section taken at the line 4 on Fig. 2 and viewed in the direction of the arrow, the underframe of the car being omitted. Figure 5 is a view like Fig. 2 of a modification of the construction shown in the preceding figures, and Figure 6, a view like Fig. 2 of still another modification of my invention.

Referring to the construction shown in Figs. 1 to 4, inclusive, which illustrates the preferred embodiment of my invention for use with a pipe which extends through openings in the cross members of a car underframe, such a cross member is represented at 6 and contains an opening 7 through which the air pipe 8 to be clamped in position, extends, the opening 7 being of considerably larger diameter than this pipe.

My improved securing means comprises two members 9 and 10 the portions thereof between their ends being of substantially concavo-convex form adapting them to partially embrace the pipe when applied thereto to the position shown. One end of the member 10 beyond its curved portion is of hook form as represented at 11, affording a straight groove 12 undercut at 13 and extending lengthwise of the member 10. The other end of this member is formed with a lug 14 containing a bolt hole 15. The member 9 is formed beyond its curved portion with a lug 16 terminating in an angularly disposed projection, or flange, 17 adapted to extend into the undercut portion 13 of the groove 12 and interlock with the hook 11 when the members are applied to the pipe, the provision of the mutually interlocking parts of the members 9 and 10 as stated permitting of the relative adjustment of these members lengthwise of each other in a direction lengthwise of the pipe without disturbing the interlock referred to. The member 9 at its other end is provided with a lug 18 containing a bolt hole 19 in alignment with the bolt hole 15 in the lug 14, the bolt hole 15 being preferably elongated lengthwise of the member 10 as more clearly shown in Fig. 3, to permit of the insertion of a bolt, such as that represented at 20, through both of these bolt holes for rigidly clamping the members 9 and 10 against the pipe, regardless of the relative lengthwise adjustment of the members 9 and 10 in the application of the device to position as hereinafter stated.

The member 9 is provided on its external surface with outwardly extending spaced apart lugs 21 which are adapted to extend at opposite sides of the vertical flange 6ª of the cross member 6 in the positioning of the clamping device for use, and serve as abutments preventing longitudinal movement of the member 9. It is to be noted in this connection that the right-hand lug 21 may be omitted as its companion lug can be depended upon to prevent movement of the clamp in one direction and the wedge 23 will prevent movement in the other direction. However, at the time of installation of the clamp, especially if the pipe 8 is free to move longitudinally, the right-hand lug is important in that it prevents movement of the clamp member 9 upon the forcible insertion of the wedge clamp member 10 as will hereinbelow appear. The member 10 is provided externally with a rib 22 extending lengthwise thereof and shaped to afford a wedge surface 23 adapted to engage the adjacent portion of the wall of the opening 7.

Assuming that the pipe 8 to be clamped, is positioned in the opening 7, the member 9 is first applied to the side of the pipe to extend into the opening 7 to receive between its lugs 21 the adjacent portion of the wall of the opening 7 as shown in Fig. 2. The member 10 is then applied to the side of the pipe and in position to interlock at its hook 11 with the flange 17 and is forcibly driven into the opening, the wedge surface 23 of said member effecting approaching movement of members 9 and 10 to tightly clamp them upon the pipe and, simultaneously with such action, wedging the entire pipe clamp into the opening. The bolt 20 is now inserted through openings 15 and 19 in members 10 and 9 respectively to prevent either of said members, but primarily the wedge member, from working out of the opening from vibration incident to the shocks and jars to which the car is subjected, and to draw the members 9 and 10 tightly into engagement with the pipe. With this method of installing and clamping the pipe, it will be noted, although the wedge surface 23 will, in practically all cases, exert sufficient clamping pressure on the pipe to hold the pipe in fixed position, that the clamping bolt 20 not only prevents withdrawal of the wedge member 10, but also holds the pipe against longitudinal shifting should the wedge surface 23 wear, or the opening in the cross flange 6ª become enlarged. Preferably the inner surfaces of the hollow curved portions of the members 9 and 10 are grooved as represented to present the sharp ridges 24 for ensuring the desired grip of the clamp against the pipe.

It will be understood that by providing the wedge surface 23 the clamping device may be caused to snugly fit the opening 7 regardless of variations in the pipes and this opening.

Referring to Fig. 5, I have shown an embodiment of my invention suitable for use with a pipe represented at 8ª which does not extend through a cross member of the car as in the case of the construction of the preceding figures, but entirely beneath such cross members. In this construction a cross member of a car is represented at 25, the pipe 8ª being supported from this cross member directly through my improved securing means the upper member of which, represented at 26 and of the same construction as the member 9 except for the omission of the lugs 21 and the addition of an extension 27 flanged at 28, is rigidly secured to the horizontal portion 25ª of the cross member 25 by a rivet 29 extending through the flanges 25ª and 28. The lower member of the clamp and represented at 30 is of the same construction as the member 10 of the preceding figures except for the omission of the wedge lug 22, the member 30 being interlocked with the member 26 by a mutually interengaging hook and projection (not shown) as in the case of the construction in the preceding figures, the members 26 and 30 being clamped about the pipe 8ª by a bolt 31 as in the case of this other construction.

Referring to Fig. 6, I have shown another embodiment of my invention suitable for use with a pipe represented at 8ᵇ and extending through a cross member of the car frame and represented at 6ᵇ and presenting the opening 7ᵇ. In this construction one of the members of the clamp device and represented at 32 and corresponding with the member 9 of the structure of Figs. 1 to 4, inclusive, is of the same construction as the member 9 except that it is not provided with the lug 18 nor with the projection 16. The other member of this clamp represented at 33 is of the same construction as the member 10 of the figures referred to except that it is not provided with the lug 14 and the extension 11, but is provided with a laterally extending lug 34 adapted to receive a bolt 35 passing through an opening 36 therein and through an opening 37 in the cross member 6ᵇ. In this construction the parts of the clamp are forced into tight engagement with the pipe 8ᵇ by the engagement of the wedge surface 38 of the member 33 with the wall of the opening 7ᵇ and drawing up of the bolt 35, the member 32 being held against longitudinal displacement in this operation by reason of the lugs thereon overlapping the wall of the opening 7ᵇ.

While I have illustrated and described certain particular constructions embodiyng my invention, I do not wish to be understood as intending to limit it thereto, as the same may be variously modified and altered without departing from the spirit of my invention.

What I claim as new, and desire to secure by Letters Patent, is:

1. The combination with a support containing an opening therethrough and a pipe extending into said opening, of means for securing said pipe to said support comprising a clamp formed of separate, relatively longitudinally movable members at opposite sides of the pipe and between which the pipe is clamped, means operating upon relative longitudinal movement of said members to force all of said members into tight engagement with the walls of said opening, and means engaging said members for clamping said members to the pipe.

2. The combination with a support containing an opening therethrough and a pipe extending into said opening, of means for securing said pipe to said support comprising a clamp formed of separate, relatively longitudinally movable members at opposite sides of the pipe and between which the pipe is clamped, one of said members having means engaging the wall of said opening for holding said member against longitudinal movement in said opening, means operating upon moving the other of said members longitudinally of said pipe to force all of said members into tight engagement with the walls of said opening, and means engaging said members for clamping said members to the pipe.

3. In combination with a support containing an opening therethrough and a pipe extending into said opening, of means for securing said pipe to said support comprising a clamp formed of separate members at opposite sides of the pipe, means at one side of said clamp for holding said members together and permitting relative ajdustment of said members in the direction of the length of the pipe, means at the other side of said pipe for drawing said members against the pipe, and means on one of said members engaging with said support for preventing lengthwise movement of said last-referred-to member, the other of said members having an external wedging surface engaging the wall of said opening, for the purpose set forth.

4. Pipe-securing means comprising a clamp formed of separate members between which the pipe is clamped, means at one side of said clamp for holding said members together and permitting relative adjustment of said members in the direction of the length of the pipe, and a device at the other side of the clamp for drawing said members against the pipe, one of said members containing an opening elongated in the direction of the length of the member containing it and through which said device passes.

5. The combination with a support having an opening and a pipe extending therethrough, of means for securing said pipe to said support comprising a clamp formed of separate members extending through said opening at opposite sides of the pipe and between which the pipe is clamped, a pair of spaced abutment-lugs on one of said members positioned for engagement with opposite sides of the support, the other member contacting with the wall of the opening and having a wedge arranged to hold the pipe and the first-named member with the lugs of the latter in cooperative relation to the support, and a bolt which clamps said members on the pipe.

6. The combination with a support having an opening and a pipe extending therethrough, of means for securing said pipe to said support comprising a clamp formed of separate members extending through said opening at opposite sides of the pipe and between which the pipe is clamped, an abutment-lug on one of said members disposed for engagement with one side of the support, the other member forming a wedge engaging the wall of the opening, and a bolt which clamps said members on the pipe.

JOHN W. FOYLE.